United States Patent
Li

(10) Patent No.: US 9,965,079 B2
(45) Date of Patent: *May 8, 2018

(54) PRESSURE-SENSITIVE TOUCH SCREEN AND TOUCH DISPLAY SCREEN AND ELECTRONIC DEVICE

(71) Applicant: SHENZHEN NEW DEGREE TECHNOLOGY CO., LTD., Shenzhen,Guangdong (CN)

(72) Inventor: Hao Li, Shenzhen (CN)

(73) Assignee: SHENZHEN NEW DEGREE TECHNOLOGY CO., LTD., Shenzhen, Guangdong (CN)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/711,588

(22) Filed: Sep. 21, 2017

(65) Prior Publication Data

US 2018/0011585 A1    Jan. 11, 2018

Related U.S. Application Data

(63) Continuation of application No. 14/724,521, filed on May 28, 2015, which is a continuation of application No. PCT/CN2013/083183, filed on Sep. 10, 2013.

(51) Int. Cl.
```
G06F 3/041     (2006.01)
G06F 3/0485    (2013.01)
G06F 3/0488    (2013.01)
G06F 3/047     (2006.01)
```

(52) U.S. Cl.
CPC ............ *G06F 3/0414* (2013.01); *G06F 3/041* (2013.01); *G06F 3/047* (2013.01); *G06F 3/0412* (2013.01); *G06F 3/0485* (2013.01); *G06F 3/0488* (2013.01); *G06F 3/04886* (2013.01); *G06F 2203/04101* (2013.01); *G06F 2203/04105* (2013.01); *G06F 2203/04803* (2013.01)

(58) Field of Classification Search
None
See application file for complete search history.

(56) References Cited

U.S. PATENT DOCUMENTS

| | | | | |
|---|---|---|---|---|
| 2004/0244495 | A1* | 12/2004 | Weber | G01L 1/2293 73/775 |
| 2012/0056817 | A1* | 3/2012 | Griffin | G06F 3/04886 345/173 |
| 2012/0105358 | A1* | 5/2012 | Momeyer | G06F 3/0414 345/174 |

(Continued)

*Primary Examiner* — Christopher Kohlman
(74) *Attorney, Agent, or Firm* — Nixon & Vanderhye PC

(57) ABSTRACT

A pressure-sensitive touch screen comprises a substrate, first and second strain sensors and a detecting circuit electrically connected to the first and second strain sensors. The substrate is configured to at least laterally deform in response to a touch and has a peripheral area. The first and second strain sensors are disposed on the peripheral area of the substrate and are adjacent to one another. The first strain sensor changes resistance in response to touch-based lateral deformation of the substrate. The second strain sensor provides a reference resistance. The detecting circuit is configured to detect a touched location and measure a pressure, based on resistance of the first strain sensor, and to use the reference resistance of the second strain sensor to compensate for changes in environmental conditions.

27 Claims, 2 Drawing Sheets

(56) References Cited

U.S. PATENT DOCUMENTS

2012/0162087 A1* 6/2012 Hou .................. G06F 1/1626
345/173
2013/0002610 A1* 1/2013 Ho .................. G02B 26/001
345/175

* cited by examiner

PRESSURE-SENSITIVE TOUCH SCREEN AND TOUCH DISPLAY SCREEN AND ELECTRONIC DEVICE

CROSS-REFERENCE TO RELATED APPLICATIONS

This application is a continuation of application Ser. No. 14/724,521, filed May 28, 2015, which is a continuation in part of Application No. PCT/CN2013/083183, filed Sep. 10, 2013. The disclosures of the prior applications are incorporated herein in their entirety by reference.

FIELD OF THE INVENTION

The present invention relates to touch screens, and more particularly to a pressure-sensitive touch screen, a touch display screen, and an electronic device.

BACKGROUND OF THE INVENTION

Nowadays, touch screens can display digital information for computers or other data processing devices, and further provide intuitive input. Touch screens are also utilized in various electronic products, through touch screens, various functions such as data input, operation, and control are achieved, and thus man-machine conversation is achieved too. In this way, much convenience is brought into production and life, and the problem that input devices, for example, keypads and mice, are inconvenient to carry can be overcome.

In the current industry, various types of touch screens, such as the capacitance type, the resistance type, the infrared type, and the surface acoustic wave type touch screens, have already existed. These touch screens detect touch location information by means of detecting the changes of the touch capacitance/the touch resistance/the obstructed infrared/the obstructed acoustic wave after a finger is applied. These types of touch screens can only obtain the location information of the users' touch operations, but cannot detect a pressure value during a touch. In the actual use, when the touch pressure value needs to be detected, these touch screens do not have any way to detect the value, and thus the application of the products is limited. Moreover, in the actual use, the precision of the detecting locations of these touch screens are realized according to the electrical principles of the touch screens. Therefore, the problem of low reliability occurs: since a resistance touch screen uses resistor film material as a part of its electrodes, the soft film material is prone to be affected by scratches and breaks, and thus the reliability will be greatly reduced; since a capacitance touch screen works according to the principle of detecting tiny capacitances, when liquid is splashed onto its surface or it is in a low temperature/high temperature condition, capacitance detection errors may occur frequently, even the touch screen may fail and its system may crash; other types of touch screens may also have similar problems, and these problems directly cause low reliabilities of the touch screens.

Furthermore, the existing touch screens are limited by input methods, for example, they may need to be directly touched by fingers without gloves, or need to be equipped with touch pens, which may bring much inconvenience to users.

SUMMARY OF THE INVENTION

The purpose of the present invention is to provide a pressure-sensitive touch screen and an electronic device, which are configured to solve the problems in the prior art that touch screens cannot detect touch pressure values, users cannot use the pressure-sensitive operation function, and the operation reliability is low.

The present invention is realized by the following technical solution: a pressure-sensitive touch screen, which comprises a substrate which has an elastic deformation performance and is configured to be operated by a user and at least one strain sensor which is configured to detect lateral deformation of the substrate and is fixedly arranged at a peripheral location of a lower surface of the substrate.

Preferably, each of the at least one strain sensor is connected in series with a reference sensor which has the same specification and parameters as the strain sensor, and each of the reference sensor(s) is adjacent to its corresponding strain sensor and is arranged at an outside of an edge of the substrate.

Preferably, the pressure-sensitive touch screen further comprises a pressure bearing plate, wherein the pressure bearing plate is fixedly arranged at an upper surface of the substrate, and the location where the side edges of the pressure bearing plate are projected onto the strain sensor is located at a middle location of the strain sensor.

Preferably, the pressure-sensitive touch screen further comprises a pressure bearing plate, wherein the pressure bearing plate is fixedly arranged at an upper surface of the substrate, and the location where the side edges of the pressure bearing plate are projected onto the reference sensor is located at a middle location of the reference sensor.

Preferably, the strain sensor is uniformly distributed along the direction of the periphery of the substrate.

Preferably, the strain sensor is arranged at four corners of the substrate.

The present invention further provides a touch display screen, which comprises a pressure-sensitive touch screen; wherein, the pressure-sensitive touch screen comprises a substrate which has an elastic deformation performance and is configured to be operated by a user and at least one strain sensor which is configured to detect lateral deformation of the substrate and is fixedly arranged at a peripheral location of a lower surface of the substrate, and an upper surface of the substrate of the pressure-sensitive touch screen is provided with a display screen unit which has rigidity and is integrated with the pressure-sensitive touch screen.

The present invention further provides another touch display screen, which comprises a pressure-sensitive touch screen; wherein, the pressure-sensitive touch screen comprises a substrate which has an elastic deformation performance and is configured to be operated by a user, at least one strain sensor which is configured to detect lateral deformation of the substrate and is fixedly arranged at a peripheral location of a lower surface of the substrate, and a display screen unit which has a rigid structure; the display screen unit is fixedly arranged at an upper surface of the substrate, and the location where the side edges of the display screen unit are projected onto the strain sensor is located at a middle location of the strain sensor.

Preferably, each of the at least one strain sensor is connected in series with a reference sensor which has the same specification and parameters as the strain sensor, and each of the reference sensor(s) is adjacent to its corresponding strain sensor and is arranged at an outside of an edge of the substrate; the display screen unit is fixedly arranged at an upper surface of the substrate, and the location where the side edges of the display screen unit are projected onto the reference sensor is located at a middle location of the reference sensor.

The present invention further provides an electronic device, which comprises any one of the aforementioned pressure-sensitive touch screens or any one of the aforementioned touch display screens.

Compared with the prior art, the present invention provides a pressure-sensitive touch screen, a touch display screen, and an electronic device, of which the strain sensor is arranged at the peripheral location of the substrate and is used to detect the horizontal elastic deformation of the substrate and thereby identify the touched location and the touch pressure value; thus, the touch input is supplied with an additional dimension, the pressure-sensitive operation function is more diversified, and various input methods can be applied. Since the operation for the touch screen is realized by detecting the strain of the substrate generated by the touch pressure, the touch operations of the users are not limited by the touch methods. Furthermore, the deformation of each strain sensor does not need to be detected, and thus the assembly and connection requirements of the strain sensor and the substrate are very low; in this way, the reliability and sensitivity of using the pressure-sensitive touch screen are improved. The above-described pressure-sensitive touch screen can simultaneously detect the pressure value and the touched location when being operated by a user, so that the pressure-sensitive operation of the touch screen is more diversified, and the convenience of operating the touch display screen and the electronic device is improved.

Figure 1:
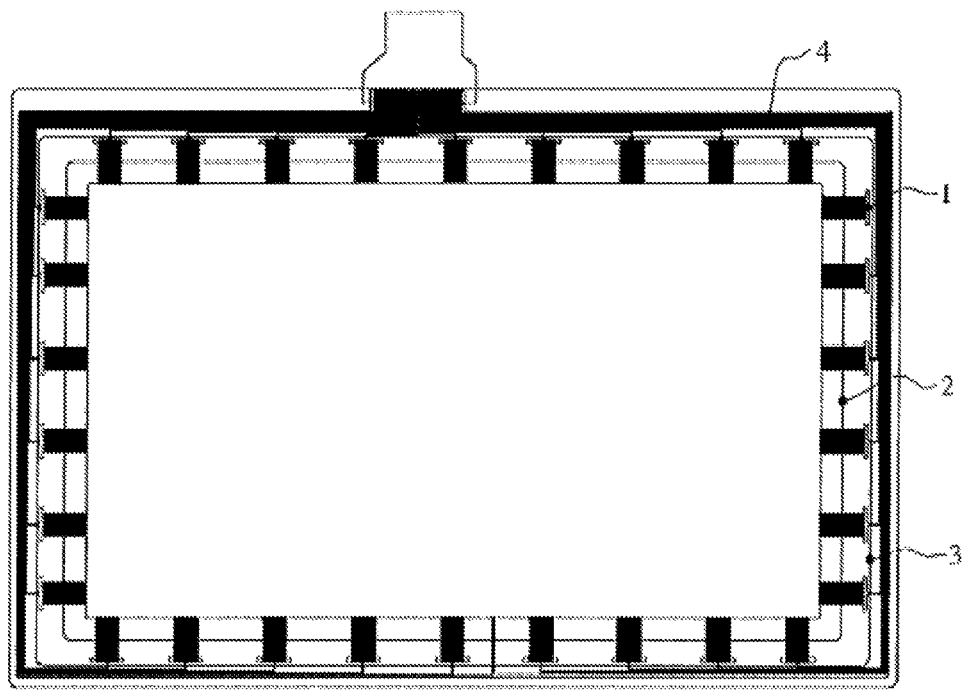
FIG. 1 is a schematic view of a rear of a pressure-sensitive touch screen of a first embodiment of the present invention.

In the drawings, the corresponding relationship between numbers and components are as follows:

1—strain sensor; 2—pressure bearing plate; 3—supporting plate; 4—substrate; 5—first metal wire; 6—second metal wire; 7—reference sensor; 8—third metal wire.

DETAILED DESCRIPTION OF THE PREFERRED EMBODIMENT

In order to make the objectives, technical solutions, and advantages of the present invention be clearer, the present invention will be further described hereafter with reference to the accompany drawings and embodiments. It should be understood that the embodiments described herein are only intended to illustrate but not to limit the present invention.

The realization of the present invention will be described hereafter with reference to the accompany drawings.

Figure 2:
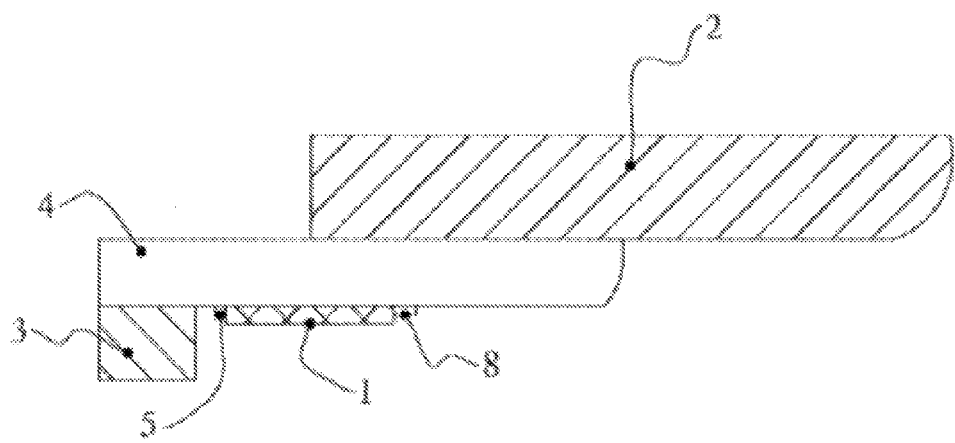
FIG. 2 is a partially and schematically cut-away view of the pressure-sensitive touch screen of the first embodiment of the present invention.

As shown in FIG. 1 and FIG. 2, the present invention provides a pressure-sensitive touch screen. In this embodiment, the pressure-sensitive touch screen includes a substrate 4 and at least one strain sensor 1; the substrate 4 has an elastic deformation performance and a high sensitivity, and can be operated by users; the strain sensor 1 is fixedly arranged at a peripheral location of a lower surface of the substrate 4. When a user touches the substrate 4, the substrate 4 generates lateral deformations along the direction of its touched surface, that is, the substrate 4 generates deformations along the length direction and the width direction thereof. The strain sensor 1 detects the amplitudes of the lateral deformations, and calculates according to the amplitudes to obtain the location touched by the user and the pressure value.

Thus, the user's touch operation is supplied with an additional operation dimension, and a pressure-sensitive operation function is provided to the user. Since the operation for the touch screen is realized by detecting the strain of the substrate 4 generated by the touch pressure, the operation is not limited by the touch methods, both non-conductive objects (e.g., pens, gloves, and so on) and conductive objects (such as fingers) can generate the touch effect, various input methods can be applied, and the deformation of each strain sensor 1 does not need to be detected. Thus, the assembly and connection requirements of the strain sensor 1 and the substrate 4 are very low, and the reliability of using the pressure-sensitive touch screen is improved.

Figure 4:
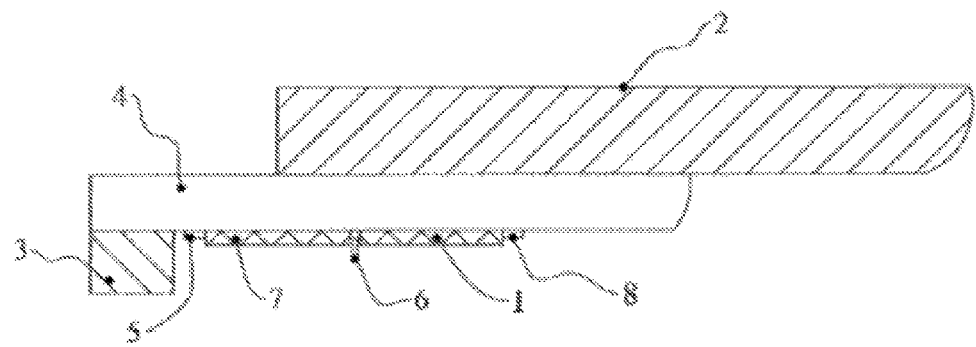
FIG. 4 is a partially and schematically cut-away view of a pressure-sensitive touch screen of a third embodiment of the present invention.

As shown in FIG. 4, each strain sensor 1 is connected in series with a reference sensor 7, in this embodiment, each reference sensor 7 has the same specification and parameters as its corresponding strain sensor 1. Thus, the design and assembly are facilitated, and the mass production is easy to realize. Each reference sensor 7 is adjacent to its corresponding strain sensor 1 and is arranged at an outside of an edge of the substrate 4. In each strain sensor 1, one end of the strain sensor 1 is connected in series with a reference sensor 7 through a second metal wire 6, and the second metal wire 6 is a signal measuring wire configured to measure signals; the other end of the strain sensor 1 is connected to a voltage supply through a third metal wire 8, and the other end of the reference sensor 7 is connected to the ground through a first metal wire 5. Since the location of each strain sensor 1 is very close to the location of the reference sensor 7 corresponding to the strain sensor 1, and the two sensors have identical specification and parameters, the ambient environment generates similar interferences on the two sensors. When a user touches and operates the substrate 4, the substrate 4 generates an elastic deformation; in particular, a portion of the strain sensor 1 contacting the substrate 4 generates a stretch deformation, and a resistance Rm of the portion of the strain sensor 1 contacting the substrate 4 increases; a portion of the reference sensor 7 contacting the substrate 4 generates a compression deformation, and a resistance R of the portion of the reference sensor 7 contacting the substrate 4 reduces. A total resistance change detected by the strain sensor 1 is a sum of a resistance $\Delta Rm$ generated by a stretch strain and an interference resistance Ri, and a total resistance change detected by the reference sensor 7 is a sum of a resistance $\Delta R$ generated by a compression strain and the interference resistance Ri. Accordingly, the difference between the two signals, that is, $(\Delta Rm+Ri)-(\Delta R+Ri)=\Delta Rm+\Delta R$, can offset the interference resistance Ri; and the strength of the touch signal is increased, because the absolute value of the touch signal becomes $\Delta Rm+\Delta R$. In this way, interferences on the sensors, which are generated by environmental factors such as the temperature or the stress, can be offset. Of course, it is unnecessary that one of the two sensors 1 and 7 is positive and the other is negative, so long as there is a big enough difference between the measurement ranges of the two sensors 1 and 7, the influence of the external environment can be reduced or eliminated by the difference detecting method, because the environment generates the same influences on the positive changing section and the negative changing section generated by the elastic deformation of the substrate 4. By means of the signal measurement through the second metal wire 6, the environmental interferences can be minimized. In this way, the pressure-sensitive touch screen provided by the present invention identifies the touch pressure value and the touched location on the one hand, and on the other hand, it is subjected to little environmental interference during touch operations and is not limited by the touch methods. Thus, the convenience and reliability of touching the touch screen are improved, and the precision of detecting the touch pressure is improved, too.

Furthermore, in this embodiment, the strain sensor 1 can be scanned and recorded at a predetermined frequency, for example, the frequency can be 60 Hz, and the touched location and the touch pressure value during each scan are detected. In this way, the movement of the touched point relative to the time can be determined, and thus the touch gesture, that is, the user's operation method, can be determined by predetermined algorithm. For example, when the touched location moves, along with the time, from the right to the left, it is evident that the touch operation is a page turning action. Moreover, the touch pressure information can be used to further define the meaning of the touch action, for example, when a page turning action is performed by a force exceeding a preset standard, turning a plurality of pages by one page turning action can be realized. In this way, the users' operation methods for the touch screen are more diversified, and it is convenient for the users to better realize "human-computer interaction" with the touch screen.

Figure 3:
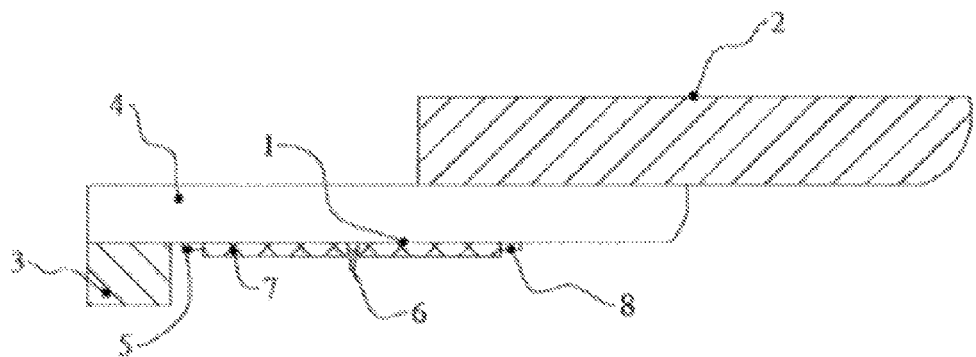
FIG. 3 is a partially and schematically cut-away view of a pressure-sensitive touch screen of a second embodiment of the present invention.

Also referring to FIG. 2, FIG. 3, and FIG. 4, the pressure-sensitive touch screen further includes a pressure bearing plate 2, the pressure bearing plate 2 is fixedly arranged at an upper surface of the substrate 4, and users can operate the substrate 4 by touching the pressure bearing plate 2. In this way, the substrate 4 can be prevented from being directly touched by users, so that wear and contamination of the substrate 4 are reduced, and the service life is increased. Wherein, in the first embodiment shown in FIG. 2 and the second embodiment shown in FIG. 3, the location where the side edges of the pressure bearing plate 2 are projected onto the strain sensor 1 is located at a middle location of the strain sensor 1. Wherein, in the third embodiment shown in FIG. 4, the location where the side edges of the pressure bearing plate 2 are projected onto the reference sensor 7 is located at a middle location of the reference sensor 7. In these designs, a touch pressure generated during a user's operation is reasonably distributed to the periphery of the substrate 4 by the pressure bearing plate 2, once the substrate 4 generates a small lateral deformation, the periphery of the substrate 4 will be drawn and deformed; thus, the strain sensor 1 can immediately detect the lateral deformation extent of the substrate 4, and the detecting sensitivity of the pressure-sensitive touch screen is improved. Preferably, the strain sensor 1 is uniformly distributed along the direction of the periphery of the substrate 4. Alternatively, the strain sensor 1 is arranged at four corners of the substrate 4.

In particular, the pressure bearing plate 2 is fixedly arranged at an upper surface of the substrate 4 by means of glue, and can be used to input information in response to touching operations of users.

As shown in FIG. 1, the strain sensor 1 is arranged at the periphery of the substrate 4, so that the central portion of the substrate 4 is not covered.

Of course, the number of the strain sensors 1 at one side edge of the substrate 4 can be larger than the number of the strain sensors 1 at any other side edge of the substrate 4 that is adjacent to the one side edge. In specific application, the number of the strain sensors 1 can be increased or decreased, and the number of the strain sensors 1 and the locations of the strain sensors 1 can be determined according to various touch screen designs.

In the actual production, the pressure bearing plate 2 is made of transparent material, such as glass, acrylic, or polycarbonate. The substrate 4 can be made of transparent material or opaque material, for example, a metal plate such as an aluminum plate or a stainless steel plate. In particular, the central portion of the substrate 4 is made of transparent material, and the peripheral portion of the substrate 4 is made of opaque material, the contents on the display screen under the substrate 4 can be observed through the central window portion of the substrate 4.

In particular, the strain sensor 1 is an electronic component made of thin metal wires, polycrystalline or amorphous semiconductors, carbon nano-tubes, or conductor-insulator composites.

As shown in FIG. 2, each strain sensor 1 is connected to a detecting circuit through a first metal wire 5 and a third metal wire 8 which are respectively arranged at two ends of the strain sensor 1. The relationship between a pressure of a user's touch and a lateral elastic deformation of the substrate 4 meets Hooke's law, that is, conforms to a linear relation; the elastic deformation of the substrate 4 generates a resistance change accordingly, by detecting the resistance change, the detecting circuit can obtain the elastic deformation extent of the substrate 4, and thereby obtain the touched location and the touch pressure value of the user's touch. In actual application, in both the lateral and longitudinal directions of the horizontal surface of the substrate 4, the strain sensors 1 are arranged in pairs, that is, in every two parallel side edges of the substrate 4, a pair of strain sensors 1 are respectively arranged at the two parallel side edges, thereby forming a lateral channel and a longitudinal channel. When a user touches different locations, the substrate 4 generates elastic deformations accordingly, and resistance changes are generated in the lateral channel and the longitudinal channel; by calculating the resistance changes generated by the substrate 4, the detecting circuit can determine the lateral coordinates and longitudinal coordinates of the touched locations and the touch pressures. In particular, when an identical location is touched, the greater the touch pressure, the greater the lateral deformation of the substrate 4, and the greater the resistance change; and the smaller the touch pressure, the smaller the lateral deformation of the substrate 4, and the smaller the resistance change. Different resistance changes correspond to different touch pressures, by collecting and calculating the resistance changes, the detecting circuit can obtain precise touched locations and touch pressures. When the touch screen is not touched, the substrate 4 recovers its original state due to its elasticity.

When two or more locations at the substrate 4 are touched simultaneously, the touched locations and the touch pressure values can also be obtained by detecting the resistance changes generated by the elastic deformations of the substrate 4. In this way, a multi-touch operation can be realized.

Moreover, the pressure-sensitive touch screen further comprises a supporting plate 3, which is arranged at a lower surface of the substrate 4, located at the outside of the periphery of the substrate 4, and positioned alternately with the strain sensor 1. The supporting plate 3 is fixedly arranged at the outside edge of the lower surface of the substrate 4, and a separation distance is formed between the supporting plate 3 and the strain sensor 1. The supporting plate 3 is usually fixedly mounted at the periphery of the lower surface of the substrate 4 by means of glue. By setting the separation distance, the strain sensor 1 is provided with a space allowing lateral movements. Thus, the elastic deformation of the substrate 4 is provided with a space; when the substrate 4 generates a deformation, it is not obstructed by other components under the substrate 4, and does not interfere with the adjacent supporting plate 3.

The present invention further provides a touch display screen, which includes any one of the above-described pressure-sensitive touch screens, and the pressure-sensitive touch screen of the touch display screen includes the substrate 4 and the strain sensor 1; the upper surface of the substrate 4 is provided with a display screen unit, the display screen unit has rigidity, is not prone to deform, and is integrated with the pressure-sensitive touch screen. In this way, the manufacturing process can be simplified, and the manufacturing cost can be reduced.

The display screen unit can also be fixedly arranged under the supporting plate 3, and a lower end of the supporting plate 3 is abutted against the periphery of the display screen unit.

The present invention further provides another touch display screen, which includes any one of the above-described pressure-sensitive touch screens, and the pressure-sensitive touch screen of the touch display screen includes a substrate 4, at least one strain sensor 1 fixedly arranged at the peripheral location of the lower surface of the substrate 4, and a display screen unit which has a rigid structure; the display screen unit is fixedly arranged at the upper surface of the substrate 4, and the side edges of the display screen unit are projected on a middle location of the strain sensor 1 or a middle location of the reference sensor 7. In fact, the pressure bearing plate 2 of the touch screen is replaced by the display screen unit having certain rigidity, such as an OLED display or a liquid crystal display. Using the display screen unit as the pressure bearing plate 2 can reduce the thickness and cost of the whole touch display screen.

Additionally, if the pressure bearing plate 2 is a resistive touch screen, a capacitive touch screen, or a surface acoustic wave touch screen, the touch display screen can directly provide the location information, and the strain sensor 1 only needs to provide the touch pressure information. In this way, the touch display screen can use only one group of strain sensors 1, and thus the circuit design is simplified.

Additionally, the display screen unit can be embedded in the pressure bearing plate 2, and the display screen unit can also be integrated with the pressure bearing plate 2. That is, the pressure bearing plate 2 has a display function.

The present invention further provides an electronic device, which includes any one of the above-described pressure-sensitive touch screens or any one of the above-described touch display screen. By adopting the above-described pressure-sensitive touch screen, the pressure value and the touched location of a user's operation can be simultaneously detected, so that the pressure-sensitive operation of the touch screen is more diversified, and the convenience of operating the electronic device is improved.

What described above are only preferred embodiments of the present invention, and are not intended to limit the scope of the present invention; and any modifications, equivalent replacements, and improvements made within the spirit and principle of the present invention should be included in the protection scope of the present invention.

The invention claimed is:

1. A pressure-sensitive touch screen, comprising:
   a substrate configured to at least laterally deform in response to a touch, the substrate having a peripheral area;
   first and second strain sensors disposed on the peripheral area of the substrate adjacent to one another, the first strain sensor changing resistance in response to touch-based lateral deformation of the substrate, the second strain sensor providing a reference resistance; and
   a detecting circuit electrically connected to the first and second strain sensors, the detecting circuit being configured to detect a touched location and measure a pressure, based on resistance of the first strain sensor, and to use the reference resistance of the second strain sensor to compensate for changes in environmental conditions.

2. The pressure-sensitive touch screen according to claim 1, wherein the first and second strain sensors have the same specification and parameters.

3. The pressure-sensitive touch screen according to claim 1, further comprising a pressure bearing plate fixedly arranged at an upper surface of the substrate.

4. The pressure-sensitive touch screen according to claim 3, wherein at least a portion of an edge of the pressure bearing plate is on top of a central area of the first strain sensor.

5. The pressure-sensitive touch screen according to claim 3, wherein at least a portion of an edge of the pressure bearing plate is on top of a central area of the second strain sensor.

6. The pressure-sensitive touch screen according to claim 3, wherein the pressure bearing plate enables a user to apply pressure to the substrate through touching the pressure bearing plate.

7. The pressure-sensitive touch screen according to claim 3, wherein the pressure bearing plate comprises a display screen or a touch screen.

8. The pressure-sensitive touch screen according to claim 3, wherein the pressure bearing plate is integrated with a display screen or a touch screen.

9. The pressure-sensitive touch screen according to claim 1, wherein the first and second strain sensors are uniformly distributed along the peripheral area of a lower surface of the substrate.

10. The pressure-sensitive touch screen according to claim 1, wherein a strain sensor is arranged at each of four corners of a lower surface of the substrate.

11. The pressure-sensitive touch screen according to claim 1, wherein at least one pair of strain sensors is arranged at two edges of a lower surface of the substrate opposing one another in a lateral direction, and at least another pair of strain sensors is arranged at another two edges of a lower surface of the substrate opposing one another in a longitudinal direction.

12. The pressure-sensitive touch screen according to claim 1, wherein the second strain sensor is disposed beside an edge of a lower surface of the substrate.

13. The pressure-sensitive touch screen according to claim 1, wherein one end of the second strain sensor is connected to ground through a first conductor, the other end of the second strain sensor is connected with one end of the first strain sensor through a second conductor, and the other end of the first strain sensor is connected to a voltage supply through a third conductor.

14. The pressure-sensitive touch screen according to claim 1, wherein, the substrate elastically deforms and thereby compresses at least a portion of the second strain sensor contacting the substrate by stretching at least a portion of the first strain sensor contacting the substrate.

15. The pressure-sensitive touch screen according to claim 1, wherein the detecting circuit comprises a difference calculator that calculates a difference between resistance changes of the first strain sensor and the second strain sensor to reduce environmental impact.

16. The pressure-sensitive touch screen according to claim 1, wherein the detecting circuit scans first strain sensor at a predetermined frequency, and is configured to detect a touched location on the substrate and a pressure of a touch for each scan of the first strain sensor.

17. The pressure-sensitive touch screen according to claim 16, wherein the detecting circuit is configured to determine a touch action based on a series of detected touched locations and/or detected pressures of a series of touches.

18. The pressure-sensitive touch screen according to claim 1, wherein a central portion of the substrate comprises a transparent material, and the peripheral area of the substrate comprises an opaque material.

19. The pressure-sensitive touch screen according to claim 1, further comprising a supporting plate arranged on a peripheral area of a lower surface of the substrate, the supporting plate being positioned a predetermined distance from the first strain sensor.

20. A touch display screen comprising:
the pressure-sensitive touch screen according to claim 1, and
a display screen arranged at an upper surface of the substrate, the display screen being rigid and integrated with the pressure-sensitive touch screen.

21. The touch display screen of claim 20 wherein the display screen comprises an OLED display.

22. The touch display screen of claim 20 wherein the display screen comprises a liquid crystal display.

23. An electronic device comprising the pressure-sensitive touch screen according to claim 1.

24. A touch display screen comprising:
a substrate configured to at least laterally deform in response to a touch, the substrate having a peripheral area and a surface;
first and second strain sensors disposed on the peripheral area of the substrate adjacent to one another, the first strain sensor changing resistance in response to touch-based lateral deformation of the substrate, the second strain sensor providing a reference resistance;
a pressure bearing plate fixedly arranged on a surface of the substrate, the pressure bearing plate having a side edge that projects onto a middle location of the first or second strain sensor; and
a detecting circuit electrically connected to the first and second strain sensors, the detecting circuit being configured to detect a touched location and measure a pressure, based on resistance of the first strain sensor, and to use the reference resistance of the second strain sensor to compensate for changes in environmental conditions.

25. A touch display screen comprising:
a substrate configured to at least laterally deform in response to a touch, the substrate having a peripheral area and a surface;
first and second strain sensors disposed on the peripheral area of the substrate adjacent to one another, the first strain sensor changing resistance in response to touch-based lateral deformation of the substrate, the second strain sensor providing a reference resistance;
a display fixedly arranged on a surface of the substrate, the display having a side edge that projects onto a middle location of the first or second strain sensor; and
a detecting circuit electrically connected to the first and second strain sensors, the detecting circuit being configured to detect a touched location and measure a pressure, based on resistance of the first strain sensor, and to use the reference resistance of the second strain sensor to compensate for changes in environmental conditions.

26. The touch display screen of claim 25 wherein the display screen comprises an OLED display.

27. The touch display screen of claim 25 wherein the display screen comprises a liquid crystal display.

* * * * *